United States Patent
Tooyama et al.

(10) Patent No.: US 11,536,365 B2
(45) Date of Patent: Dec. 27, 2022

(54) MALFUNCTION LOCATION DETECTION DEVICE FOR AUTOMATIC TRANSMISSION, AND AUTOMATIC TRANSMISSION PROVIDED WITH SAME

(71) Applicants: JATCO Ltd, Fuji (JP); NISSAN MOTOR CO., LTD., Yokohama (JP)

(72) Inventors: Yutaka Tooyama, Kanagawa (JP); Fumitaka Nagashima, Fuji (JP); Takateru Kawaguchi, Susono (JP); Hideharu Yamamoto, Odawara (JP); Masahiro Hamano, Atsugi (JP)

(73) Assignees: JATCO LTD, Fuji (JP); NISSAN MOTOR CO., LTD., Yokohama (JP)

( * ) Notice: Subject to any disclaimer, the term of this patent is extended or adjusted under 35 U.S.C. 154(b) by 320 days.

(21) Appl. No.: 16/082,144

(22) PCT Filed: Feb. 10, 2017

(86) PCT No.: PCT/JP2017/004840
§ 371 (c)(1),
(2) Date: Sep. 4, 2018

(87) PCT Pub. No.: WO2017/150137
PCT Pub. Date: Sep. 8, 2017

(65) Prior Publication Data
US 2019/0093761 A1 Mar. 28, 2019

(30) Foreign Application Priority Data

Mar. 4, 2016 (JP) .............................. JP2016-042489

(51) Int. Cl.
*F16H 59/70* (2006.01)
*F16H 61/12* (2010.01)
*F16H 61/686* (2006.01)

(52) U.S. Cl.
CPC ............. *F16H 61/12* (2013.01); *F16H 59/70* (2013.01); *F16H 61/686* (2013.01);
(Continued)

(58) Field of Classification Search
CPC .. F16H 59/70; F16H 61/12; F16H 2061/1232; F16H 2061/1276
USPC .......................................................... 701/62
See application file for complete search history.

(56) References Cited

U.S. PATENT DOCUMENTS

2007/0021261 A1 1/2007 Morise et al.
2008/0153655 A1 6/2008 Kawaguchi et al.
(Continued)

FOREIGN PATENT DOCUMENTS

| JP | 2007-024231 A | 2/2007 |
| JP | 2008-232355 A | 10/2008 |
| JP | 2010-286095 A | 12/2010 |
| WO | WO-2014/024790 A1 | 2/2014 |

OTHER PUBLICATIONS

Machine Translation of JP2010286095A, Dec. 2010 (Year: 2010).*
International Preliminary Report on Patentability received in PCT/JP2017/004840 dated Jan. 18, 2018.
(Continued)

*Primary Examiner* — Charles A Fox
*Assistant Examiner* — Michael E Butler
(74) *Attorney, Agent, or Firm* — Foley & Lardner LLP (57) ABSTRACT

A malfunction part sensing device for an automatic transmission for a vehicle which is arranged to attain a plurality of shift stages by selectively engaging a plurality of frictional engagement elements, the malfunction part sensing device includes: a shift stage monitoring section configured to monitor the shift stages before and after the shift of the automatic transmission; a malfunction sensing section configured to sense the malfunction mode from a behavior of the vehicle which is generated in accordance with the malfunction; and a malfunction part limiting section configured to limit the one of the frictional engagement elements in which
(Continued)

the malfunction is generated, based on the malfunction mode and a shift manner by a combination of the shift stages before and after the shift.

4 Claims, 6 Drawing Sheets

(52) U.S. Cl.
CPC .............. *F16H 2061/1208* (2013.01); *F16H 2061/1224* (2013.01); *F16H 2061/1276* (2013.01); *F16H 2200/0065* (2013.01); *F16H 2200/2012* (2013.01); *F16H 2200/2046* (2013.01)

(56) References Cited

U.S. PATENT DOCUMENTS

| | | | |
|---|---|---|---|
| 2008/0234088 A1 | 9/2008 | Kawaguchi et al. | |
| 2011/0246036 A1* | 10/2011 | Tsutsui | F16H 61/143 701/67 |
| 2011/0270483 A1* | 11/2011 | Endo | F16H 61/12 701/31.4 |
| 2013/0268168 A1* | 10/2013 | Arnold | F16H 61/686 701/58 |

OTHER PUBLICATIONS

International Search Report and Written Opinion received in PCT/JP2017/004840 dated May 16, 2017.

\* cited by examiner

ENGAGEMENT TABLE

| SPEED NUMBER | B08 | B06 | B05 | K27 | K81 | K38 |
|---|---|---|---|---|---|---|
| 1 | | ○ | ○ | | | ○ |
| 2 | | ○ | | | ○ | ○ |
| 3 | | ○ | ○ | | ○ | |
| 4 | | ○ | ○ | ○ | | |
| 5 | | | ○ | ○ | ○ | |
| 6 | | | | ○ | ○ | ○ |
| 7 | | | ○ | ○ | | ○ |
| 8 | ○ | | | ○ | | ○ |
| 9 | ○ | | ○ | ○ | | |
| Rev | ○ | ○ | ○ | | | |

FIG.5

| SINGLE CHANGEOVER SHIFT MODE | | | |
|---|---|---|---|
| ONE SHIFT STAGE | SKIP SHIFT STAGE | | |
| 9 ←→ 8 | 9 ←→ 7 | 9 ←→ 5 | 9 ←→ 4 |
| 8 ←→ 7 | 8 ←→ 6 | | |
| 7 ←→ 6 | 7 ←→ 5 | 7 ←→ 4 | 7 ←→ 1 |
| 6 ←→ 5 | 6 ←→ 2 | | |
| 5 ←→ 4 | 5 ←→ 3 | | |
| 4 ←→ 3 | 4 ←→ 1 | | |
| 3 ←→ 2 | 3 ←→ 1 | | |
| 2 ←→ 1 | | | |

| | SHIFT STAGE AFTER SWITCHING | | | | | | | | |
|---|---|---|---|---|---|---|---|---|---|
| SHIFT STAGE BEFORE SWITCHING | | 1 | 2 | 3 | 4 | 5 | 6 | 7 | 8 | 9 |
| | 1 | | A | A | A | B | C | A | C | B |
| | 2 | A | | A | B | B | A | C | C | D |
| | 3 | A | A | | A | A | C | C | E | C |
| | 4 | A | C | A | | A | C | A | C | A |
| | 5 | C | C | A | A | | A | A | C | A |
| | 6 | C | A | B | B | A | | A | A | B |
| | 7 | A | C | B | A | A | A | | A | A |
| | 8 | C | C | D | B | B | A | A | | A |
| | 9 | C | E | C | A | A | C | A | A | |

(b)

| B05 | B06 | B08 |
|---|---|---|
| K27 | K38 | K81 |

A — MALFUNCTION PART CAN BE IDENTIFIED
(ONE MALFUNCTION)

B — MALFUNCTION PART CAN BE IDENTIFIED
(K38 IS INCLUDED IN TWO MALFUNCTIONS, IT IS IDENTICAL TO A)

C — MALFUNCTION PART CANNOT BE IDENTIFIED
(ONE OF TWO IS MALFUNCTIONED)

D — MALFUNCTION PART CANNOT BE IDENTIFIED
(K38 IS INCLUDED IN THREE MALFUNCTIONS, IT IS IDENTICAL TO C)

E — MALFUNCTION PART CAN BE IDENTIFIED
(ONE OF THREE IS MALFUNCTIONED)

FIG.7

MALFUNCTION LOCATION DETECTION DEVICE FOR AUTOMATIC TRANSMISSION, AND AUTOMATIC TRANSMISSION PROVIDED WITH SAME

CROSS-REFERENCE TO RELATED APPLICATIONS

This application is a National Phase of International Patent Application No. PCT/JP2017/004840, filed Feb. 10, 2017, which claims priority to Japanese Patent Application No. 2016-042489, filed Mar. 4, 2016. The contents of these applications are herein incorporated by reference in their entirety.

TECHNICAL FIELD

This invention relates to a malfunction part sensing device for an automatic transmission which is configured to identify a malfunctioned frictional engagement element at the malfunction of one of frictional engagement elements of the stepwise automatic transmission, and an automatic transmission provided with same.

BACKGROUND ART

A stepwise automatic transmission (stepwise transmission, hereinafter, referred to merely as an automatic transmission) attains a predetermined shift stage by engaging a part of a plurality of frictional engagement elements. However, in this case, a functional malfunction may be generated so as not to control engagement and disengagement of the frictional engagement element due to generation of malfunction of hardware constitution such as a solenoid valve arranged to control the engagement state of one of the frictional engagement elements.

For example, a malfunction by which the frictional engagement element that is the engagement object cannot be engaged (engagement failure or erroneous disengagement) is generated, the automatic transmission becomes neutral state. Moreover, the malfunction by which the frictional engagement that is not the engagement object cannot be disengaged (disengagement failure or erroneous engagement) is generated, the frictional engagement elements which are not normally engaged at the same time are operated to be engaged, so that the vehicle becomes an interlock state (a state toward the interlock state).

In a case where the erroneous disengagement is generated, the automatic transmission is brought to the neutral state. Accordingly, a traveling drive force of the vehicle is eliminated, so that a deviation between a gear ratio of a command shift stage and an actual gear ratio is generated. Moreover, a load to the driving source is eliminated. Accordingly, in a case where the driving source is an engine (internal combustion engine), the engine is raced. Consequently, when the engine is raced, or when the deviation between the gear ratio of the command shift stage and the actual gear ratio is generated, it is possible to be judged that the erroneous disengagement is generated in one of the frictional engagement elements.

Moreover, in a case where the erroneous engagement is generated, the automatic transmission is brought to the interlock state. Accordingly, the output rotation of the automatic transmission is decreased toward the vehicle stop. Furthermore, the deviation between the gear ratio of the command shift stage, and the actual gear ratio is generated. Accordingly, when the sudden decrease of the vehicle speed is generated even though the deceleration operation is not performed, or when the deviation between the gear ratio of the command shift stage and the actual gear ratio is generated, it is possible to be judged that the erroneous engagement is generated in one of the frictional engagement elements. These arts are disclosed in a patent document 1 and so on.

In this way, when the erroneous disengagement or the erroneous engagement is generated in the frictional engagement element, it is necessary to ensure a traveling ability of the vehicle to avoid the influence of the malfunction. For ensuring the traveling ability (a limp home function), it is necessary to identify (specify, determine) a kind of the malfunction (the erroneous disengagement or the erroneous engagement), and the frictional engagement element in which the malfunction is generated. The kind of the malfunction can be judged from a behavior of the vehicle. Conventionally, the identification of the malfunctioned frictional engagement element is performed as following process (a) to (d).

(a) Firstly, the shift stage (for example, the shift stage which is near the current shift stage on the low speed side) in which the over revolution is not generated in the engine, and in which the sudden deceleration is not generated in the vehicle is set to a provisional limp home shift stage. Alternatively, the transmission is set to the neutral stage. It is shifted to this shift stage.

(b) Next, the vehicle is stopped so as to safely shift to this limp hole state.

(c) Selectable shift stage is selected from this stop state. The frictional engagement elements are engaged or operated to be engaged to attain this shift stage. Then, the traveling of the vehicle is attempted. When the vehicle is traveled without problem, the frictional engagement elements by which this shift stage is attained are in the normal state. When the vehicle cannot be started, it is possible to be judged that one of the frictional engagement elements by which that shift stage is attained is malfunctioned. The malfunctioned frictional engagement element is identified by repeating this attempt (this control is referred to as "prove control").

(d) After the malfunctioned frictional engagement element is identified, the shift stage (limp home shift stage) by which the vehicle can be safely traveled to a repair shop is selected from attainable shift stages. The vehicle is traveled by using this shift stage.

However, in a case where "the prove control" is used as described above, the vehicle is once stopped for ensuring the safety even when the gear ratio is varied. Then, the prove control is performed to identify the malfunction part. Accordingly, the time period is needed for the identification of the limp home shift stage. It is not possible to rapidly shift to the limp home shift stage.

Moreover, until the prove control is started after it is judged that the malfunction is generated in one of the frictional engagement elements, the shift stage is shifted to the shift stage in which the over revolution is not generated, and in which the sudden deceleration is not generated in the vehicle, or the vehicle is shifted to the neutral, irrespective of the driver's intention. Accordingly, the traveling ability is remarkably decreased. For example, the insufficient acceleration feeling (acceleration failure feeling) is provided to the driver which requires the acceleration, so as to provide large stress to the driver.

PRIOR ART DOCUMENT

Patent Document

Patent Document 1: Japanese Patent Application Publication No. 2008-232355

SUMMARY OF THE INVENTION

It is, therefore, an object of the present invention to provide a malfunction part sensing device devised to solve the above-described problems, and to rapidly limit a malfunction part during traveling so as not to provide large stress to a driver, and an automatic transmission provided with the same.

(1) A malfunction part sensing device for an automatic transmission for a vehicle which is arranged to attain a plurality of shift stages by selectively engaging a plurality of frictional engagement elements, the malfunction part sensing device being configured, when a malfunction by a malfunction mode of an engagement failure or disengagement failure is generated in one of the plurality of the frictional engagement elements, to identify the one of the frictional engagement elements in which the malfunction is generated, the malfunction part sensing device comprises: a shift stage monitoring means configured to monitor the shift stages before and after the shift of the automatic transmission; a malfunction sensing means configured to sense the malfunction mode from a behavior of the vehicle which is generated in accordance with the malfunction; and a malfunction part limiting means configured to limit the one of the frictional engagement elements in which the malfunction is generated, based on the malfunction mode and a shift manner by a combination of the shift stages before and after the shift.

(2) It is preferable that the malfunction part limiting means is configured to grasp the frictional engagement elements which are controlled to be operated at the shift, from the shift manner, and to limit the one of the frictional engagement elements in which the malfunction is generated, from the grasped frictional engagement elements to a part of the frictional engagement elements.

(3) It is preferable that the malfunction part limiting means is configured to grasp the frictional engagement elements which are controlled to be operated at the shift, from the shift manner, and to identify the one of the frictional engagement elements in which the malfunction is generated, from the grasped frictional engagement elements to one.

(4) It is preferable that the malfunction part sensing device comprises an operation state sensing means configured to sense an operation state of an engagement or a disengagement of a predetermined frictional engagement element in the plurality of the frictional engagement elements; and when the predetermined frictional engagement element relates to the shift, the malfunction part identifying means is configured to limit the one of the frictional engagement elements in which the malfunction is generated, to a part of the frictional engagement elements, based on the shift manner of the shift, the malfunction mode, and the operation state of the predetermined frictional engagement element.

(5) It is preferable that the malfunction part sensing device comprises a storing means configured to store a map to identify the one of the frictional engagement elements in which the malfunction is generated, in accordance with the malfunction mode and the shift manner; and the malfunction part limiting means is configured to limit the one of the frictional engagement elements in which the malfunction is generated, by using the map from the malfunction mode and the shift manner.

(6) An automatic transmission which is a stepwise automatic transmission that is mounted on a vehicle, and which is arranged to switch a shift stage by a changeover of one of a plurality of frictional engagement elements, the automatic transmission comprises: the malfunction part sensing device for the vehicle defined in one of (1) to (5); and a shift control means configured, when the malfunction part sensing device identifies the one of the frictional engagement elements in which the malfunction is generated, to determine a malfunction corresponding shift stage, and to switch the shift stage to the malfunction corresponding shift stage.

In the present invention, when the generation of the malfunction of the one of the frictional engagement elements is sensed by the shift, the malfunction part limiting means is configured to limit the malfunctioned one of the frictional engagement elements based on a shift manner by a combination of the shift stages before and after the shift, and the malfunction mode sensed by the malfunction sensing means. Accordingly, it is possible to rapidly identify the malfunction part, to determine the malfunction corresponding shift stage (the limp home shift stage), and to shift to the malfunction corresponding shift stage. With this, it is possible to suppress the decrease of the traveling ability so as not to provide the large stress to the driver.

BRIEF DESCRIPTION OF DRAWINGS

FIG. 6A shows the overall map. FIG. 6B shows details in the map.

DESCRIPTION OF EMBODIMENTS

Hereinafter, an embodiment according to the present invention is explained with reference to the drawings. Besides, a below-described embodiment is merely example. It is not intended to exclude various variations and applications of the art which are not described in the below-described embodiment. Configurations in the below-described embodiment can be varied as long as they are not deviated from the gist of the invention. Moreover, they can be selected and combined if necessary.

[1. Overall System Configuration]

Figure 1:
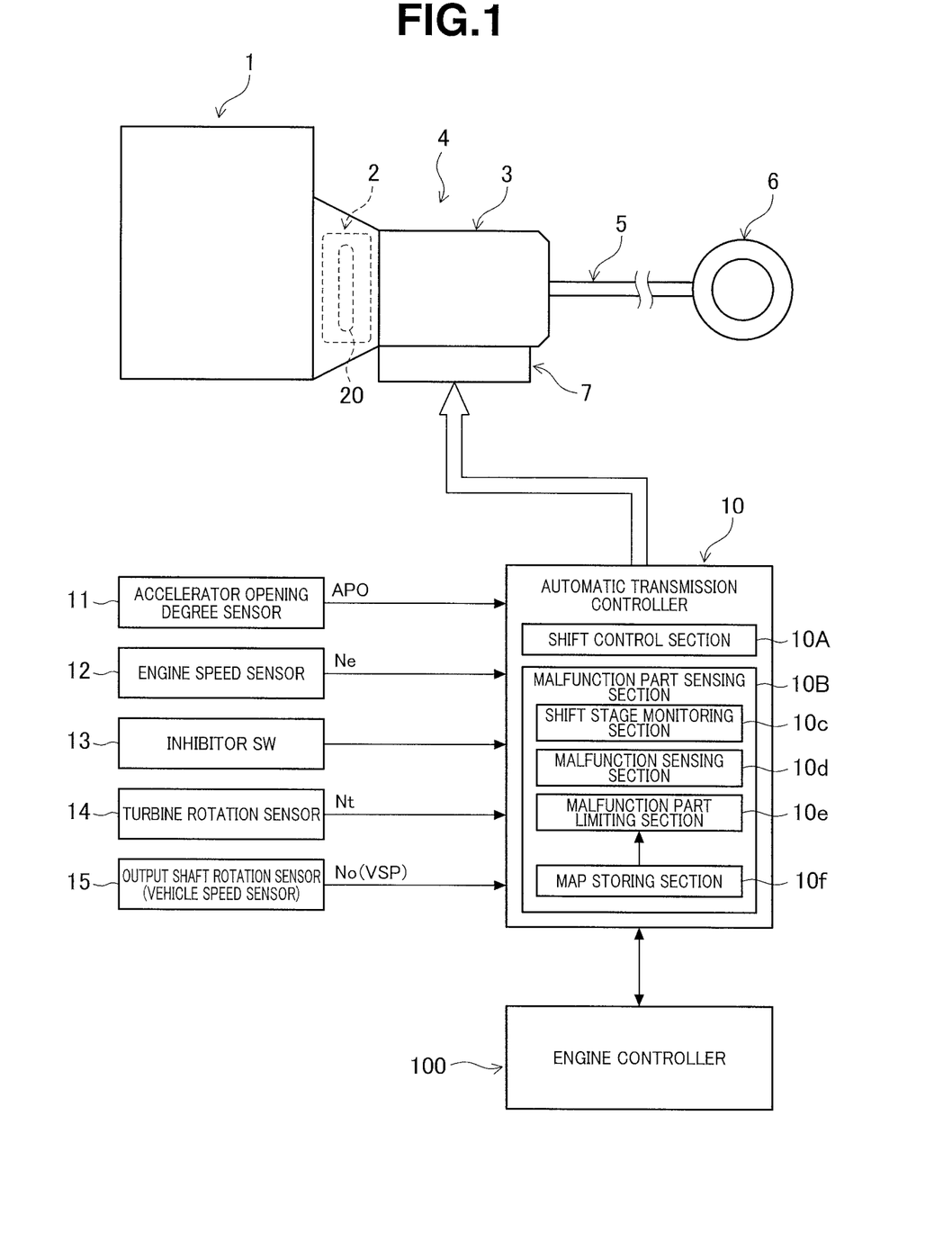
FIG. 1 is an overall system configuration view showing a power train and a control system thereof (including a malfunction part sensing device of an automatic transmission) for a vehicle according to one embodiment of the present invention.

As shown in FIG. 1, a power train of a vehicle according to the one embodiment includes an engine 1 which is a driving source; and a stepwise automatic transmission (stepwise transmission, hereinafter, referred to merely as an automatic transmission) 4 including a torque converter 2 having a lockup clutch, and a stepwise automatic shift mechanism 3; and a power transmitting mechanism 5 disposed between an output shaft of the automatic transmission 4 and a driving wheel 6.

The stepwise automatic shift mechanism 3 is connected to the engine 1 through the torque converter 2 having the lockup clutch 20. The stepwise automatic shift mechanism 3 includes various frictional engagement elements (clutch or brake). The stepwise automatic shift mechanism 3 is arranged to attain shift stages (gear stages) by engaging or disengaging these frictional engagement elements. The engagements and the disengagements of these frictional engagement elements, or the engagement state of the lockup clutch of the torque converter 2 is performed by switching the supply state of the oil by controlling predetermined solenoid valves provided in a hydraulic pressure circuit unit 7.

There is provided an automatic transmission controller (transmission control means) 10 configured to control the hydraulic pressure circuit unit 7. Moreover, there is provided an engine controller 100 configured to control the engine 1. The automatic transmission controller 10 is configured to control the hydraulic pressure circuit unit 7 based on information from various sensors 11 to 15. Besides, the automatic transmission controller 10 and the engine controller 100 are connected with each other to communicate the information, so as to control the automatic transmission 4 and the engine 1 in cooperation with each other.

[2. Configuration of Automatic Transmission]

Figure 2:
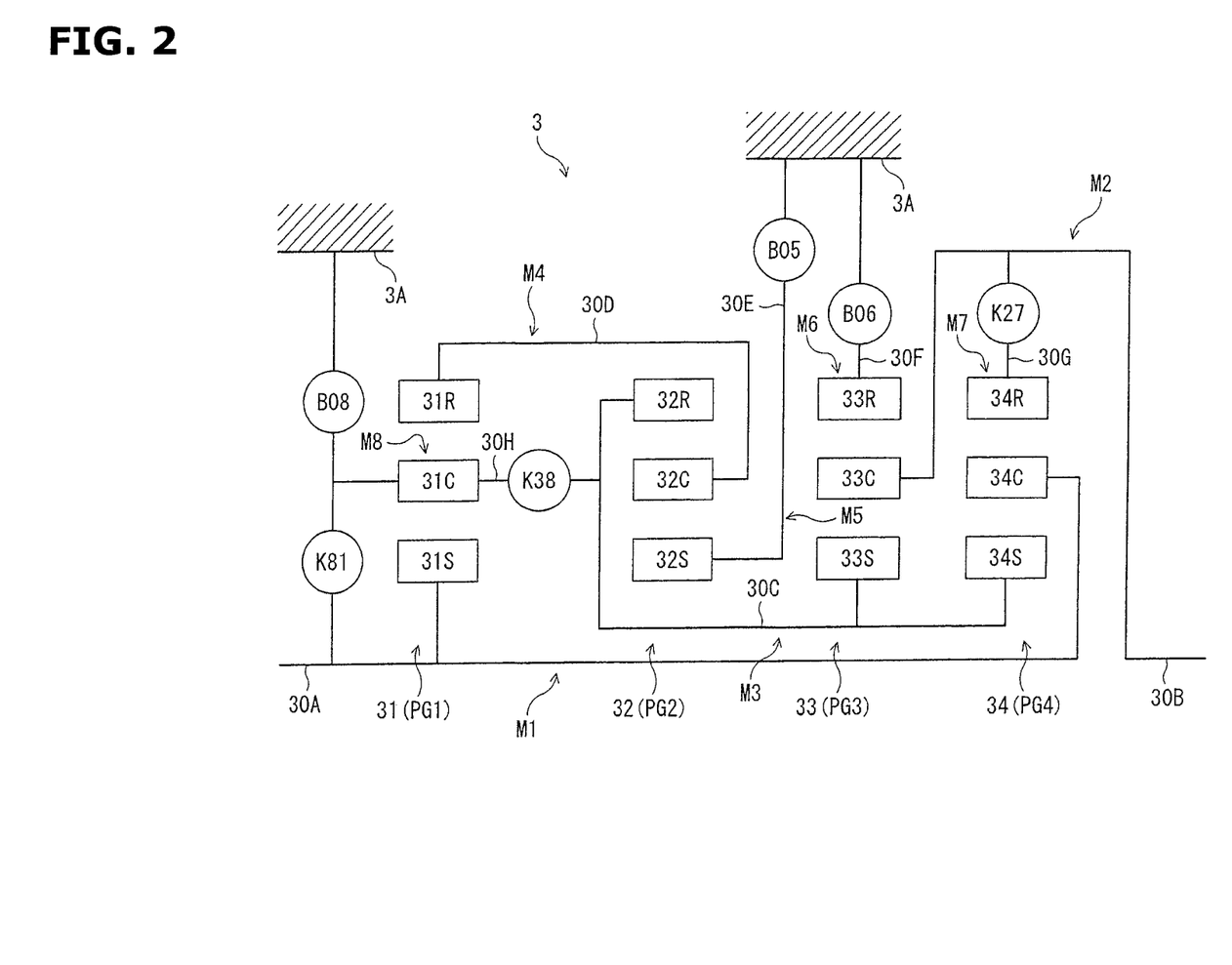
FIG. 2 is a skeleton diagram showing a configuration of a stepwise automatic transmission according to the one embodiment of the present invention.

As shown in FIG. 2, the automatic shift mechanism 3 includes four planetary gear mechanism of a first planetary gear mechanism (PG1) 31, a second planetary gear mechanism (PG2) 32, a third planetary gear mechanism (PG3) 33, and a fourth planetary gear mechanism (PG4) 34 which are coaxially disposed in series with each other, so as to attain shift stages of forward nine speeds of first to ninth speed, and a backward speed. The planetary gear mechanism 31 to 34 include, respectively, sun gears (first constitution elements) 31S to 34S, carriers (second constitution elements) 31C to 34C, and ring gears (third constitution elements) 31R to 34R.

The automatic shift mechanism 3 includes an input shaft 30A to which a rotation is inputted from the engine 1 through the torque converter 2; an output shaft 30B arranged to output the rotation through the power transmitting mechanism 5 to the driving wheel; and intermediate shafts 30C and 30D each connecting specific elements of the planetary gear mechanisms 31 to 34. Predetermined power transmitting paths are attained by selective combination of predetermined elements of the planetary gear mechanism 31 to 34, so that the corresponding shift stages are attained.

That is, the sun gear 31S of the first planetary gear mechanism 31, and the carrier 34C of the fourth planetary gear mechanism 34 are directly connected to the input shaft 30A of the automatic shift mechanism 3. Accordingly, the sun gear 31S of the first planetary gear mechanism 31, and the carrier 34C of the fourth planetary gear mechanism 34 are arranged to constantly rotate as a unit with the input shaft 30A. Moreover, the carrier 31C of the first planetary gear mechanism 31 is connected through a second clutch K81 to the input shaft 30A. Besides, the input shaft 30A, the sun gear 31S, and the carrier 34C which are arranged to rotate as a unit with each other are referred to as a first rotation member M1.

The carrier 33C of the third planetary gear mechanism 33 is directly connected to the output shaft 30B of the automatic shift mechanism 3. Accordingly, the carrier 33C of the third planetary gear mechanism 33 is arranged to constantly rotate as a unit with the output shaft 30B. Moreover, the ring gear 34R of the fourth planetary gear mechanism 34 is connected through a first clutch K27 to the output shaft 30B of the automatic shift mechanism 3. Besides, the output shaft 30B and the carrier 33C which are arranged to rotate as a unit with each other are referred to as a second rotation member M2.

The ring gear 32R of the second planetary gear mechanism 32, the sun gear 33S of the third planetary gear mechanism 33, and the sun gear 34S of the fourth planetary gear mechanism 34 are directly connected to the intermediate shaft 30C. Accordingly, the ring gear 32R of the second planetary gear mechanism 32, the sun gear 33S of the third planetary gear mechanism 33, and the sun gear 34S of the fourth planetary gear mechanism 34 are arranged to constantly rotate as a unit with each other. Besides, the intermediate shaft 30C, the ring gear 32R, the sun gear 33S, and the sun gear 34S which are arranged to rotate as a unit with each other are referred to as a third rotation member M3.

The ring gear 31R of the first planetary gear mechanism 31, and the carrier 32C of the second planetary gear mechanism 32 are directly connected to the intermediate shaft 30D. Accordingly, the ring gear 31R of the first planetary gear mechanism 31, and the carrier 32C of the second planetary gear mechanism 32 are arranged to constantly rotate as a unit with each other. Besides, the intermediate shaft 30D, the ring gear 31R, and the carrier 32C are referred to as a fourth rotation member M4.

The carrier 31C of the first planetary gear mechanism 31 is connected with a connection shaft 30H to rotate as a unit with the connection shaft 30H. The carrier 31C is connected through this connection shaft 30H and a third clutch K38 to the intermediate shaft 30C. Moreover the carrier 31C of the first planetary gear mechanism 31 is connected through this connection shaft 30H and a first brake B08 to a transmission case 3A.

Moreover, the sun gear 32S of the second planetary gear mechanism 32 is connected to a connection shaft 30E to rotate as a unit with the connection shaft 30E. The sun gear 32S is connected through this connection shaft 30E and a third brake B05 to the transmission case 3A.

Furthermore, the ring gear 33R of the third planetary gear mechanism 33 is connected to a connection shaft 30F to rotate as a unit with the connection shaft 30F. The ring gear 33R is connected through the connection shaft 30F and a second brake B06 to the transmission case 3A.

Moreover, the ring gear 34R of the fourth planetary gear mechanism 34 is connected to a connection shaft 30G to rotate as a unit with the connection shaft 30G. The ring gear 34R is connected through the connection shaft 30G to one end of the first clutch K27.

The connection shaft 30E and the sun gear 32S which are arranged to rotate as a unit with each other are referred to as a fifth rotation member M5. The connection shaft 30F and the ring gear 33R which are arranged to rotate as a unit with each other are referred to as a sixth rotation member M6. The connection shaft 30G and the ring gear 34R which are arranged to rotate as a unit with each other are referred to as a seventh rotation member M7. The connection shaft 30H and the carrier 31C which are arranged to rotate as a unit with each other are referred to as an eighth rotation member M8.

Furthermore, the third to eighth rotation members M3 to M8 disposed between the input shaft 30A and the output shaft 30B are also referred to as intermediate elements.

The thus-constructed automatic shift mechanism 3 is arranged to attain one of the forward nine speeds of the first speed to the ninth speed, and the backward speed, by combination of the engagements of the frictional engagement elements of the first clutch K27, the second clutch K81, the third clutch K38, the first brake B08, the second brake B06, the third brake B05, and so on.

Figure 3:
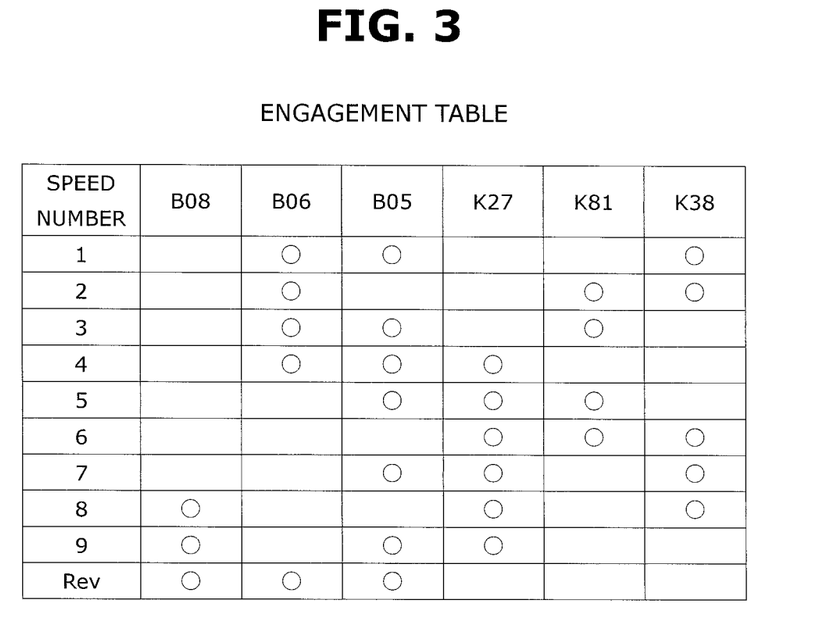
FIG. 3 is an engagement operation table of frictional engagement elements at each shift stage of the stepwise automatic transmission according to the one embodiment of the present invention.

FIG. 3 is an engagement operation table showing engagement states of the frictional engagement elements in the respective shift stages in the automatic shift mechanism 3. In FIG. 3, a symbol ○ represents the engagement state of the frictional engagement element. A blank represents the disengagement state of the frictional engagement element. Speed number 1 to 9 represents the forward first speed to ninth speed. A speed number Rev represents the backward speed.

As shown in FIG. 3, for attaining the first speed, the second brake B06, the third brake B05, and the third clutch K38 are engaged, and the other frictional engagement elements are disengaged. For attaining the second speed, the second brake B06, the second clutch K81, and the third clutch K38 are engaged, and the other frictional engagement elements are disengaged. For attaining the third speed, the second brake B06, the third brake B05, and the second clutch K81 are engaged, and the other frictional engagement elements are disengaged.

For attaining the fourth speed, the second brake B06, the third brake B05, and the first clutch K27 are engaged, and the other frictional engagement elements are disengaged. For attaining the fifth speed, the third brake B05, the first clutch K27, and the second clutch K81 are engaged, and the other frictional engagement elements are disengaged. For attaining the sixth speed, the first clutch K27, the second clutch K81, and the third clutch K38 are engaged, and the other frictional engagement elements are disengaged.

For attaining the seventh speed, the third brake B05, the first clutch K27, and the third clutch K38 are engaged, and the other frictional engagement elements are disengaged. For attaining the eighth speed, the first brake B08, the first clutch K27, and the third clutch K38 are engaged, and the other frictional engagement elements are disengaged. For attaining the ninth speed, the first brake B08, the third brake B05, and the first clutch K27 are engaged, and the other frictional engagement elements are disengaged. For attaining the backward speed, the first brake B08, the second brake B06, and the third brake B05 are engaged, and the other frictional engagement elements are disengaged.

[3. Shift Control of Automatic Transmission]

Figure 4:
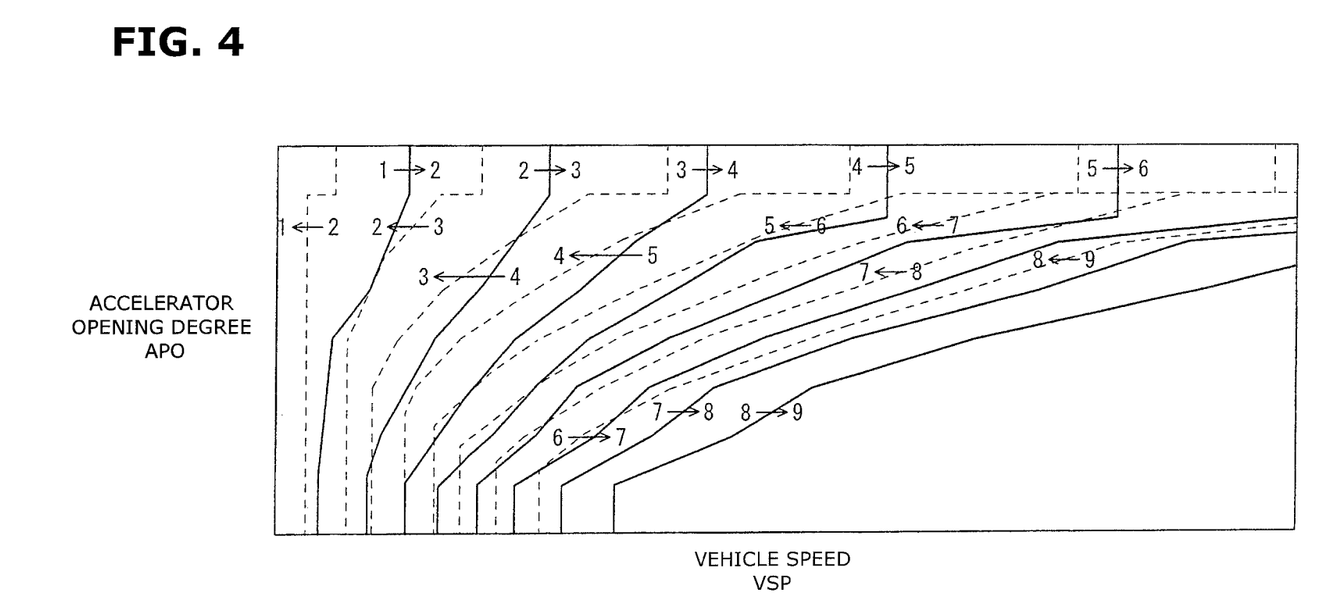
FIG. 4 is a shift line diagram of the stepwise automatic transmission according to the one embodiment of the present invention.

The automatic transmission controller 10 is configured to perform the shift control by the engagements and the disengagements of the frictional engagement elements of the automatic shift mechanism 3. FIG. 4 is a shift line diagram used in the shift control at a selection of a D range. In FIG. 4, a solid line represents an upshift line. A broken line shows a downshift line. Besides, as shown in FIG. 1, the automatic transmission controller 10 is configured to receive information from an accelerator opening degree sensor 11, an engine speed sensor 12, an inhibitor switch 13, a turbine rotation sensor (input shaft rotation sensor) 14, and an output shaft rotation sensor (vehicle speed sensor) 15.

The automatic transmission controller 10 includes a shift control section (shift control means) 10A configured to control the automatic shift mechanism 3; and a malfunction part sensing section (malfunction part sensing means) 10B configured to sense which one of the frictional engagement elements is malfunctioned at generation of the malfunction of the one of the frictional engagement elements.

The shift control section 10A is configured to judge a selection of the range from a range selection information of the inhibitor switch 13. At the selection of the D range, the shift control section 10A is configured to retrieve (search), in the shift line diagram, a position of a driving point determined based on a vehicle speed VSP obtained from a transmission output shaft rotation speed No (transmission output shaft rotation speed $\omega_2$) from the output shaft rotation sensor 15, and an accelerator opening degree APO from the accelerator opening degree sensor 11. Then, the shift control section 10A is configured to maintain the shift stage at that time when the driving point is not moved, or when the driving point exists in the one shift stage region in the shift line diagram of FIG. 4 even in a case where the driving point is moved.

On the other hand, when the driving point is moved across the upshift line in the shift line diagram of FIG. 4, the shift control section 10A is configured to output an upshift command from the shift stage represented by the region in which the driving point exists before the movement across the upshift line, to the shift stage represented by the region in which the driving point exists after the movement across the upshift line. Moreover, when the driving point is moved across the downshift line in the shift line diagram of FIG. 4, the shift control section 10A is configured to output a downshift command from the shift stage represented by the region in which the driving point exists before the movement across the downshift line, to the shift stage represented by the region in which the driving point exists after the movement across the downshift line.

As described above, the automatic transmission is arranged to attain the predetermined shift stage by engaging a part of the frictional engagement elements in the plurality of the frictional engagement elements. However, the malfunction may be generated in the hardware constitution such as the solenoid valve arranged to control the engagement state of one of the frictional engagement elements. With this, a functional malfunction may be generated so that the engagement and the disengagement of the frictional engagement element cannot be controlled. For handling the above-described situation, it is necessary to sense how the one of the frictional engagement elements is malfunctioned. The malfunction part sensing device senses these conditions.

[4. Malfunction Part Sensing Device]

The malfunction part sensing device according to this embodiment is provided as a functional element (the malfunction part sensing section 10B) within the automatic transmission controller 10. As shown in FIG. 1, the malfunction part sensing device 10B includes a shift stage monitoring section (shift stage monitoring means) 10c, a malfunction sensing section (malfunction sensing means) 10d; and a malfunction limiting section (malfunction part limiting means) 10e.

The shift stage monitoring section 10c is configured to monitor the shift (the shift stage switching) of the automatic transmission 4, and the shift stages before and after the shift at this time, from the command shift stage by the shift control section 10A.

The malfunction sensing section 10d is configured to sense the generation of the malfunction, and a mode (condition) of the malfunction. That is, when the malfunction is generated in the one of the frictional engagement elements, a deviation between the gear ratio (the transmission gear ratio) of the command shift stage, and the actual gear ratio (the transmission gear ratio) is generated.

Besides, the information of the command shift stage at this time can be obtained from the monitoring information of the shift stage monitoring section 10c. Moreover, the information of the actual gear ratio can be obtained from the sensing information of the turbine rotation sensor 14 and the output shaft rotation sensor 15.

When this malfunction is a malfunction in which the frictional engagement element cannot be engaged (engagement failure, or erroneous disengagement), the deviation between the command value and the actual value of the gear ratio of the transmission is generated. Moreover, the engine is raced to suddenly increase the engine speed. The engine speed information at this time can be obtained from the engine speed sensor 12.

Moreover, when this malfunction is a malfunction in which the frictional engagement elements that are not normally engaged at the same time are engaged, that is, in which it becomes an interlock state (state toward the interlock) (disengagement failure, or erroneous engagement), the deviation of the gear ratios is generated. Furthermore, the vehicle speed is suddenly decreased. The vehicle speed information at this time can be obtained from the detection information of the engine speed sensor 12 and the output shaft rotation sensor 15.

When the generation of the malfunction of the frictional engagement element is sensed by the switching of the shift stage (referred to merely as the shift, or the shift stage switching) based on the information from the shift stage monitoring section 10c and the malfunction sensing section 10d, the malfunction part limiting section 10e is configured to limit the malfunctioned one of the frictional engagement elements, based on the shift stage combination before and after this shift stage switching, and the mode (condition) of the malfunction sensed by the malfunction sensing section 10d, that is, the erroneous disengagement or the erroneous engagement. Besides, this limitation includes a case where the malfunctioned frictional engagement element is identified to one, and a case where the malfunctioned frictional engagement element is limited to plural elements of a part of the frictional engagement elements.

A method of limiting or identifying (specifying, determining) the malfunctioned frictional engagement element by the malfunction part limiting section 10e is explained.

As shown in FIG. 3, in this embodiment, the desired shift stage is attained by engaging three of the six frictional engagement elements of the first clutch K27, the second clutch K81, the third clutch K38, the first brake B08, the second brake B06, and the third brake B05, and by disengaging the other elements.

At the shift stage switching, one or more of the three engaged frictional engagements is switched to the disengagement, and one or more of the three disengaged frictional engagements is switched to the engagement. That is, the shift stage switching is performed by the changeover of one pair of the frictional engagement elements (the single changeover), by the changeover of two pairs of the frictional engagement elements (the double changeover), or by the changeover of three pairs of the frictional engagement elements (the triple changeover).

Figure 5:
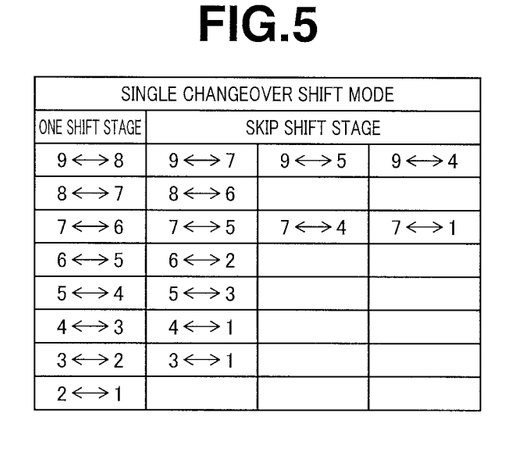
FIG. 5 is a table showing a specific shift kind which is applied to a malfunction part detection according to the one embodiment of the present invention.

In case of the automatic transmission 4 according to the embodiment, the shift stage switching shown in FIG. 5 is performed by the single changeover. The shift stage switching by this single changeover includes one shift stage shift in which the shift stage is upshifted or downshifted to adjacent shift stage, and a skip shift stage shift in which the shift stage is upshifted or downshifted to a remote shift stage.

In case of the shift stage switching by the single changeover, one of the three engaged frictional engagement elements is switched to the disengagement, and one of the three disengaged frictional engagement elements is switched to the engagement. Accordingly, when it is sensed that the erroneous disengagement is generated by the shift stage switching, it is possible to identify (specify) that the frictional engagement element which is commanded to be switched from the disengagement to the engagement is in the erroneous disengagement state.

Moreover, when the erroneous disengagement or the erroneous engagement is generated by the shift stage switching, it has been understood that there is high possibility that the erroneous disengagement or the erroneous engagement is generated in the frictional engagement element which is commanded to be switched. Accordingly, in case of the shift stage switching by the single changeover, when it is sensed that the erroneous engagement is generated by the shift stage switching, it is possible to identify (specify) the frictional engagement element which is commanded to be switched from the engagement to the disengagement is in the erroneous engagement state.

In case of the shift stage switching by the double changeover, two of the three engaged frictional engagement elements are switched to the disengagement, and two of the three disengaged frictional engagement elements are switched to the engagement. Accordingly, when it is sensed that the erroneous disengagement is generated by the shift stage switching, it is possible to limit either of the two frictional engagement elements which are commanded to be switched from the disengagement to the engagement, to the erroneous disengagement state. However, it is not possible to identify the frictional engagement element in the erroneous disengagement state to one, although it is possible to narrow the frictional engagement element in the erroneous disengagement state to two.

In case of the shift stage switching by the double changeover, when it is sensed that the erroneous engagement is generated by the shift stage switching, it is possible to limit either of the two frictional engagement elements which are commanded to be switched from the engagement to the disengagement, to the erroneous engagement state. However, it is not possible to identify the frictional engagement element in the erroneous disengagement state to one, although it is possible to narrow the frictional engagement element in the erroneous disengagement state to two.

Moreover, even in case of the shift stage switching by the double changeover, it is possible to identify which two frictional engagement elements that are commanded to be switched from the disengagement to the engagement is in the erroneous disengagement state, and to identify which two frictional engagement elements that are commanded to be switched from the engagement to the disengagement is in the erroneous engagement state, in case where a state of one of the frictional engagement elements relating to the changeover can be grasped.

In this embodiment, it is possible to sense whether the clutch K38 (a predetermined frictional engagement element) is in the engagement state or the disengagement state by the hydraulic pressure sensor that is an operation state sensing means, although it is not shown in the drawing. Accordingly, it is possible to grasp whether that state is in the normal state, the erroneous disengagement state, or the erroneous engagement state. Consequently, in the shift stage switching by the double changeover, when it is understood that the frictional engagement elements in the erroneous disengagement state or the erroneous engagement state are narrowed to two, and when one of the two frictional engagement elements is the clutch K38, it is possible to identify the frictional engagement element in the erroneous disengagement state or the erroneous engagement state to one.

Similarly, even in case of the shift stage switching by the triple changeover, it is possible to narrow the frictional engagement elements in the erroneous disengagement state or in the erroneous engagement state to two, in a case where a state of one (in this case, the clutch K38) of the frictional engagement elements relating to the changeover can be grasped.

In the malfunction part sensing device, a map storing section (storing means) 10f is configured to store a map for identifying the frictional engagement element in which the malfunction is generated, in accordance with the mode (condition) of the malfunction, and the switching pattern of the shift stage (the shift pattern which is the combination of the shift stages before and after the shift stage switching. The malfunction part identifying section 10e is configured to identify the frictional engagement element in which the malfunction is generated, by using this map from the mode of the malfunction, and the switching pattern of the shift stage.

FIG. 6(a) is a view showing this map. 1 to 9 in the longitudinal direction represent the shift stages before the shift stage switching. 1 to 9 in the transverse direction represent the shift stages after the shift stage switching. The shift stage switching is represented as a combination of these by a matrix shape. Symbols A, B, C, D, and E are provided to respective elements of the matrix. A represents the shift stage switching by the single changeover. B and C represent the shift stage switching by the double changeover. D and E represent the shift stage switching by the triple changeover.

In the double changeover B and C, B is a case where it is possible to grasp the state of one of two frictional engagement elements (in this case, the clutch K38). C is a case where it is not possible to grasp the above-described state. Moreover, in the triple changeover D and E, D is a case where it is possible to grasp the state of one of two frictional engagement elements (in this case, the clutch K38). C is a case where it is not possible to grasp the above-described state.

Besides, this map includes two maps for the erroneous disengagement state judgment and for the erroneous engagement state judgment.

A is the case of the shift stage switching by the single changeover. As described above, the frictional engagement element in the erroneous disengagement state or the erroneous engagement state can be identified to one. For example, when it is sensed that the frictional engagement element is in the erroneous disengagement state at the shift stage switching from the fourth speed to the third speed, it is the shift stage switching by the single changeover, as shown by A in FIG. 6(a). Specifically, the clutch K27 is switched from the engagement state to the disengagement state, and the clutch K81 is switched from the disengagement state to the engagement state (cf. FIG. 3). Accordingly, it is possible to identify the clutch K81 switched from the disengagement state to the engagement state, as the erroneous disengagement state. The corresponding matrix element A in the map describes that the clutch K81 is the erroneous disengagement, as shown in FIG. 6(b).

B is a case of the shift stage switching by the double changeover. In this case, it is possible to grasp the state of one (in this case, the clutch K38) of the two frictional engagement elements relating to the changeover. Accordingly, the corresponding matrix element B in the map describes one frictional engagement element in the erroneous disengagement.

C is a case of the shift stage switching by the double changeover. In this case, it is not possible to grasp one of two frictional engagement elements relating to the changeover. Accordingly, the corresponding matrix element C in the map describes two candidates of the frictional engagement elements in the erroneous disengagement.

D is a case of the shift stage switching by the triple changeover. In this case, it is possible to grasp the state of one (in this case, the clutch K38) of the three frictional engagement elements relating to the switching. Accordingly, the corresponding matrix element D in the map describes two narrowed candidates of the frictional engagement elements in the erroneous disengagement.

E is a case of the shift stage switching by the triple changeover. In this case, it is not possible to grasp one of the three frictional engagement elements relating to the changeover. Accordingly, the corresponding matrix element E in the map describes three candidates of the frictional engagement elements in the erroneous disengagement.

In this way, when the malfunction part sensing device according to this embodiment cannot identify the frictional engagement element in which the malfunction is generated, to one, following prove control shown by (a) to (c) are applied to the candidates of the frictional engagement elements which are limited to three or less, so as to identify the frictional engagement element in which the malfunction is generated, to one.

(a) Firstly, the shift stage in which the over-revolution is not generated in the engine, and in which the sudden deceleration is not generated in the vehicle is set to a provisional limp home shift stage. Alternatively, the transmission is set to the neutral stage. It is shifted to this shift stage.

(b) Next, the vehicle is stopped so as to safely shift to this limp home state.

(c) Selectable shift stage is selected from this stop state. The frictional engagement elements are engaged or operated to be engaged to attain this shift stage. Then, the traveling of the vehicle is attempted. When the vehicle can be traveled without problem, the frictional engagement elements by which this shift stage are attained is in the normal state. When the vehicle cannot be started, it is possible to be judged that one of the frictional engagement elements by which this shift stage is attained is malfunctioned. The malfunctioned frictional engagement element is identified by repeating this attempt.

Then, when the mode of the malfunction and the frictional engagement elements in which the malfunction is generated is identified to one, the shift control section 10A determines a limp home shift stage (malfunction corresponding shift stage) based on the identified malfunction frictional engagement element, and the current shift stage. The shift stage is switched to the limp home shift stage.

[5. Operations and Effects]

Figure 7:
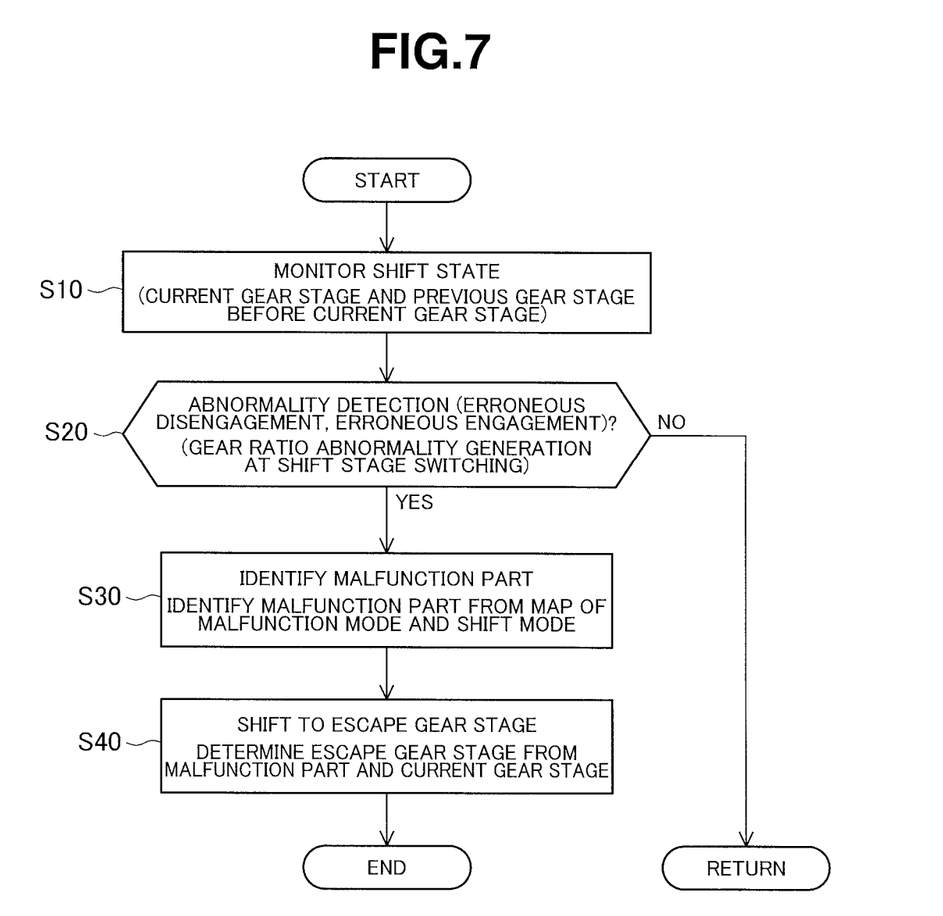
FIG. 7 is a flowchart explaining operations of the malfunction portion detection according to the present invention.

The automatic transmission and the malfunction part sensing device of the automatic transmission according to the one embodiment of the present invention is constructed as described above. Accordingly, for example, it is possible to perform the detection of the malfunction part and retreating operation, as shown in FIG. 7.

That is, firstly, the current gear stage (the current shift stage) and the previous gear stage before the current gear stage are stored while constantly monitoring the shift stage (step S10).

At the switching of the shift stage, the abnormality is judged, that is, it is judged whether or not the erroneous disengagement or the erroneous engagement is generated in one of the frictional engagement elements, based on the abnormality of the gear ratio, and so on (step S20). When the abnormality is not sensed, the process is returned. In the next control cycle, the process performs steps S10 again.

Figure 6:
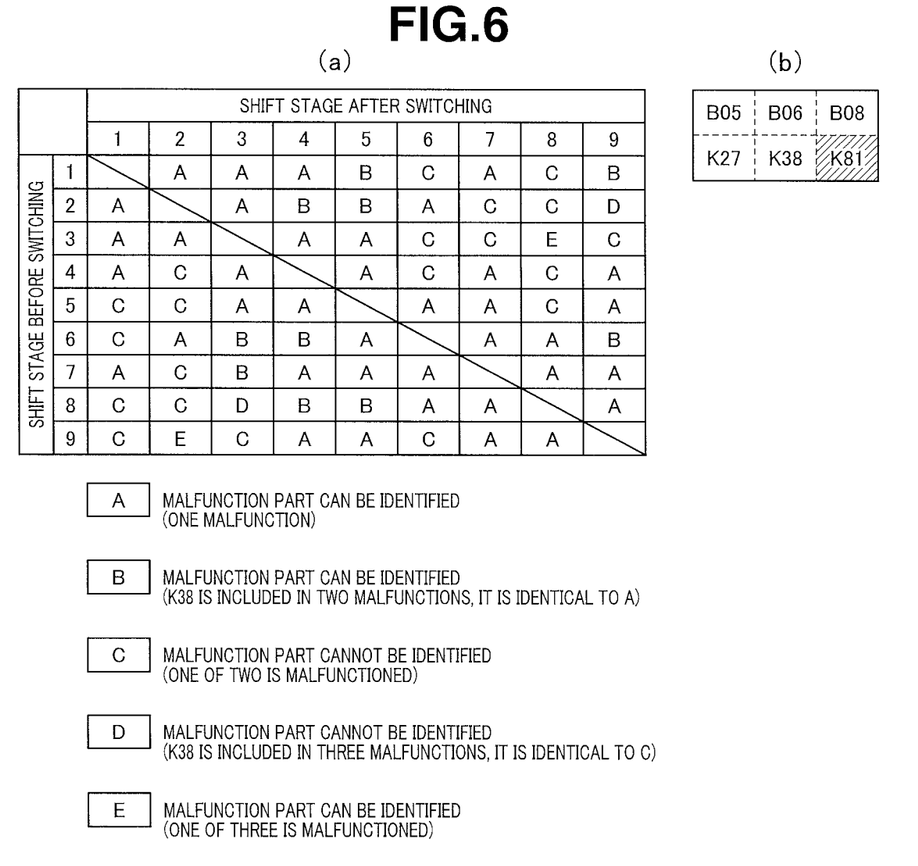
FIGS. 6A and 6B are views showing maps used for the malfunction part detection according to the one embodiment of the present invention.

When the abnormality is sensed, the malfunction part (the frictional engagement element in which the malfunction is generated) is identified (step S30). This identification is performed by using the map shown in FIG. 6(*a*), based on the malfunction mode (the erroneous disengagement or the erroneous engagement) and the shift kind (the shift stage switching from what speed to what speed).

In this case, in the condition shown in C to E of the map, it is not possible to identify the malfunction part. However, in this case, the frictional engagement element in which the malfunction is generated is identified to one by using the prove control.

After the mode of the malfunction and the frictional engagement element in which the malfunction is generated is identified to one, the limp home shift stage is determined based on the identified malfunction frictional engagement element and the current shift stage. The shift stage is shifted to the limp home shift stage (step S40).

In this way, in the malfunction part sensing device according to this embodiment, the malfunction mode (the erroneous disengagement or the erroneous engagement), and the malfunctioned frictional engagement may be identified to one when the malfunction is generated in one of the frictional engagement elements at the shift stage switching during the traveling of the vehicle. In this case, the malfunction part is rapidly identified while the vehicle is maintained to be traveled. The limp home shift stage is rapidly determined. The shift stage is shifted to the limp home shift stage. In particular, in this embodiment, the frictional engagement element in which the malfunction is generated can be instantaneously identified by using the map.

Moreover, even when the malfunctioned frictional engagement element is not identified to one, it is possible to narrow the candidate of the malfunctioned frictional engagement element. It is possible to effectively perform the prove control during the short time period. With this, it is possible to improve the traveling ability so as not to provide large stress to the driver.

[6. Others]

Hereinabove, the embodiment of the present invention is explained. However, the malfunction part sensing device according to the present invention can be attained by arbitrarily varying the above-described embodiment as long as they are not deviated from the gist of the present invention.

For example, in the above-described embodiment, the shift mechanism is the shift mechanism 3 which has the forward nine speeds, and which is shown in FIG. 2. However, the present invention is applicable to an automatic transmission having various stepwise automatic shift mechanisms which are constituted by a plurality of gear mechanisms, and which are arranged to attain shift stages by selective engagements of a plurality of frictional engagement elements.

The invention claimed is:

1. A malfunction part sensing device for an automatic transmission for a vehicle which is arranged to attain a plurality of shift stages by selectively engaging a plurality of frictional engagement elements, and to switch the shift stage by changeovers of two or more pairs of the frictional engagement elements, the malfunction part sensing device being configured, when a malfunction by a malfunction mode of an engagement failure or disengagement failure is generated in one of the plurality of the frictional engagement elements, to identify the one of the frictional engagement elements in which the malfunction is generated, the malfunction part sensing device comprising:

a shift stage monitoring section configured to monitor the shift stages before and after the shift of the automatic transmission;

a malfunction sensing section configured to sense the malfunction mode from a behavior of the vehicle which is generated in accordance with the malfunction; and a malfunction part limiting section configured to limit the one of the frictional engagement elements in which the malfunction is generated, based on the malfunction mode and a shift manner by a combination of the shift stages before and after the shift, wherein in the shift stage switching by the changeovers of the two or more pairs of the frictional engagement elements, the malfunction part limiting section is configured to grasp the frictional engagement elements which are controlled to be operated at the shift, from the shift manner, and to limit the one of the frictional engagement elements in which the malfunction is generated, from the grasped frictional engagement elements to a part of the frictional engagement elements, wherein the malfunction part sensing device comprises at least one operation state sensor configured to sense an operation state of an engagement or a disengagement of at least one predetermined frictional engagement element in the plurality of the frictional engagement elements, but less than all of the frictional engagement elements of the plurality of the frictional engagement elements; and when the predetermined frictional engagement element relates to the shift, the malfunction part limiting section is configured to limit the one of the frictional engagement elements in which the malfunction is generated, to a part of the frictional engagement elements, based on the shift manner of the shift, the malfunction mode, and the operation state of the predetermined frictional engagement element, and wherein when the operation state sensor identifies the one of the frictional engagement elements in which the malfunction is generated, a malfunction corresponding shift stage is determined based on the identified one of the frictional engagement elements in which the malfunction is generated, and the shift stage is shifted to the malfunction corresponding shift stage, and when the operation state sensor does not identify the one of the frictional engagement elements in which the malfunction is generated, the one of the frictional engagement elements in which the malfunction is generated is identified by repeatedly performing a prove control in which a selectable shift stage is selected in a stop state of the vehicle, in which the frictional engagement elements are engaged or disengaged to attain the shift stage, and in which a traveling of the vehicle is attempted, the malfunction corresponding shift stage is determined based on the identified one of the frictional engagement elements, and the shift stage is shifted to the malfunction corresponding shift stage.

2. The malfunction part sensing device for the automatic transmission as claimed in claim 1, wherein the malfunction part limiting section is configured to grasp the frictional engagement elements which are controlled to be operated at the shift, from the shift manner, and to identify the one of the frictional engagement elements in which the malfunction is generated, from the grasped frictional engagement elements to one.

3. The malfunction part sensing device for the automatic transmission as claimed in claim 1, wherein the malfunction part sensing device comprises a storing section configured to store a map to identify the one of the frictional engagement elements in which the malfunction is generated, in accordance with the malfunction mode and the shift manner; and the malfunction part limiting section is configured to limit the one of the frictional engagement elements in which the malfunction is generated, by using the map from the malfunction mode and the shift manner.

4. An automatic transmission for a vehicle which is a stepwise automatic transmission that is mounted on a vehicle, which is arranged to attain a plurality of shift stages by selectively engaging a plurality of frictional engagement elements, and which is arranged to switch a shift stage by a changeover of one of a plurality of frictional engagement elements, and to switch the shift stage by changeovers of two or more pairs of the frictional engagement elements, the automatic transmission comprising:
  a malfunction part sensing device being configured, when a malfunction by a malfunction mode of an engagement failure or disengagement failure is generated in one of the plurality of the frictional engagement elements, to identify the one of the frictional engagement elements in which the malfunction is generated,
  the malfunction part sensing device including;
  a shift stage monitoring section configured to monitor the shift stages before and after the shift of the automatic transmission;
  a malfunction sensing section configured to sense the malfunction mode from a behavior of the vehicle which is generated in accordance with the malfunction; and
  a malfunction part limiting section configured to limit the one of the frictional engagement elements in which the malfunction is generated, based on the malfunction mode and a shift manner by a combination of the shift stages before and after the shift,
  wherein in the shift stage switching by the changeovers of the two or more pairs of the frictional engagement elements, the malfunction part limiting section is configured to grasp the frictional engagement elements which are controlled to be operated at the shift, from the shift manner, and to limit the one of the frictional engagement elements in which the malfunction is generated, from the grasped frictional engagement elements to a part of the frictional engagement elements, and
  wherein the malfunction part sensing device comprises at least one operation state sensor configured to sense an operation state of an engagement or a disengagement of at least one predetermined frictional engagement element in the plurality of the frictional engagement elements, but less than all of the frictional engagement elements of the plurality of the frictional engagement elements; and when the predetermined frictional engagement element relates to the shift, the malfunction part limiting section is configured to limit the one of the frictional engagement elements in which the malfunction is generated, to a part of the frictional engagement elements, based on the shift manner of the shift, the malfunction mode, and the operation state of the predetermined frictional engagement element,
  a shift control section configured, when the malfunction part sensing device identifies the one of the frictional engagement elements in which the malfunction is generated, to determine a malfunction corresponding shift stage, and to switch the shift stage to the malfunction corresponding shift stage, and
  wherein when the operation state sensor identifies the one of the frictional engagement elements in which the malfunction is generated, a malfunction corresponding shift stage is determined based on the identified one of the frictional engagement elements in which the malfunction is generated, and the shift stage is shifted to the malfunction corresponding shift stage, and
  when the operation state sensor does not identify the one of the frictional engagement elements in which the malfunction is generated, the one of the frictional engagement elements in which the malfunction is generated is identified by repeatedly performing a prove control in which a selectable shift stage is selected in a stop state of the vehicle, in which the frictional engagement elements are engaged or disengaged to attain the shift stage, and in which a traveling of the vehicle is attempted, the malfunction corresponding shift stage is determined based on the identified one of the frictional engagement elements, and the shift stage is shifted to the malfunction corresponding shift stage.

* * * * *